United States Patent
Hans et al.

(10) Patent No.: US 12,026,087 B2
(45) Date of Patent: Jul. 2, 2024

(54) AUTOMATICALLY TESTING ARTIFICIAL INTELLIGENCE MODELS IN CONNECTION WITH ENTERPRISE-RELATED PROPERTIES

(71) Applicant: International Business Machines Corporation, Armonk, NY (US)

(72) Inventors: Sandeep Hans, New Delhi (IN); Diptikalyan Saha, Bangalore (IN); Aniya Aggarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 17/537,053

(22) Filed: Nov. 29, 2021

(65) Prior Publication Data

US 2023/0168994 A1    Jun. 1, 2023

(51) Int. Cl.
*G06F 11/36* (2006.01)
*G06F 8/41* (2018.01)
*G06F 16/901* (2019.01)

(52) U.S. Cl.
CPC .......... *G06F 11/3684* (2013.01); *G06F 8/433* (2013.01); *G06F 16/9024* (2019.01)

(58) Field of Classification Search
CPC .. G06F 11/3684; G06F 16/9024; G06F 8/433; G06N 20/00
See application file for complete search history.

(56) References Cited

U.S. PATENT DOCUMENTS 7,701,820 B2 * 4/2010 Setono ............... G11B 7/00736
369/116
9,460,408 B2    10/2016 Berlandier et al.
(Continued)

FOREIGN PATENT DOCUMENTS

WO    2016004075 A1    1/2016

OTHER PUBLICATIONS

Farchi et al., Ranking Data Slices for ML Model Validation: A Shapley Value Approach, 37th IEEE International Conference on Data Engineering (ICDE), 2021.
(Continued)

*Primary Examiner* — Ziaul A Chowdhury
(74) *Attorney, Agent, or Firm* — Ryan, Mason & Lewis, LLP

(57) ABSTRACT

Methods, systems, and computer program products for automatically testing AI models in connection with enterprise-related properties are provided herein. A computer-implemented method includes obtaining an artificial intelligence model and information pertaining to one or more existing enterprise-related properties associated with the artificial intelligence model; generating test data for the artificial intelligence model by processing at least a portion of the information pertaining to one or more existing enterprise-related properties; executing at least a portion of the generated test data against the artificial intelligence model; generating, based at least in part on results of the executing of the at least a portion of the generated test data against the artificial intelligence model, one or more enterprise-related property recommendations for the artificial intelligence model; and performing one or more automated actions based at least in part on the one or more enterprise-related property recommendations.

20 Claims, 5 Drawing Sheets

(56) References Cited

U.S. PATENT DOCUMENTS

| | | | |
|---|---|---|---|
| 10,157,347 B1* | 12/2018 | Kasturi | G06F 16/3326 |
| 10,872,002 B2* | 12/2020 | Jannu | G06F 9/542 |
| 2011/0066490 A1* | 3/2011 | Bassin | G06F 11/3684 |
| | | | 705/348 |
| 2020/0210881 A1 | 7/2020 | Wu et al. | |
| 2020/0387814 A1 | 12/2020 | Yellapragada et al. | |
| 2020/0401503 A1 | 12/2020 | Gao | |
| 2021/0158076 A1* | 5/2021 | Lohia | G06F 18/23213 |

OTHER PUBLICATIONS

Natu et al., Discovering Interesting Subsets Using Statistical Analysis, International Conference on Management of Data COMAD, 2008.

Chung et al., Automated Data Slicing for Model Validation: A Big Data-AI Integration Approach, IEEE Transactions on Knowledge and Data Engineering, 32(12), 2284-2296, 2019.

IBM.com, Validating and monitoring AI models with Watson OpenScale, Why does Watson OpenScale need access to my training data?, https://www.ibm.com/docs/en/cloud-paks/cp-data/2.5.0?topic=openscale-frequently-asked-questions#trainingdata , 2019.

* cited by examiner

AUTOMATICALLY TESTING ARTIFICIAL INTELLIGENCE MODELS IN CONNECTION WITH ENTERPRISE-RELATED PROPERTIES

BACKGROUND

The present application generally relates to information technology and, more particularly, to data processing techniques. More specifically, artificial intelligence (AI) models are increasingly used for a variety of applications. Additionally, AI models are commonly tested for accuracy in connection with a number of such applications. However, conventional AI model approaches typically fail to test AI models for fairness-related properties, robustness-related properties, and enterprise-related properties.

SUMMARY

In at least one embodiment, techniques for automatically testing AI models in connection with enterprise-related properties are provided. An example computer-implemented method can include obtaining an artificial intelligence model and information pertaining to one or more existing enterprise-related properties associated with the artificial intelligence model, generating test data for the artificial intelligence model by processing at least a portion of the information pertaining to one or more existing enterprise-related properties, and executing at least a portion of the generated test data against the artificial intelligence model. The method can also include generating, based at least in part on results of the executing of the at least a portion of the generated test data against the artificial intelligence model, one or more enterprise-related property recommendations for the artificial intelligence model, and performing one or more automated actions based at least in part on the one or more enterprise-related property recommendations.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
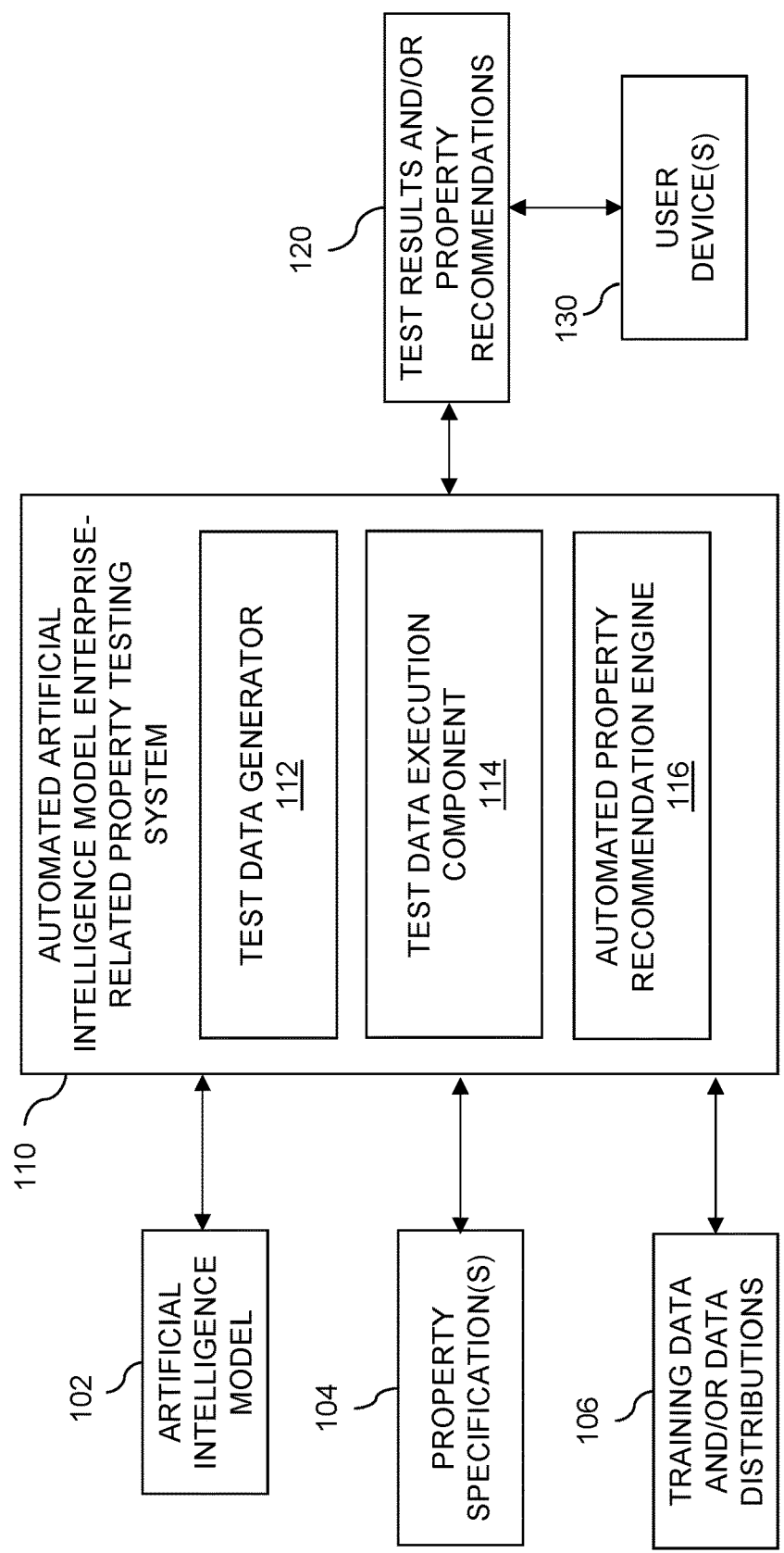
FIG. 1 is a diagram illustrating system architecture, according to an example embodiment of the invention.

As described herein, at least one embodiment includes automatically testing AI models in connection with enterprise-related properties. For example, such an embodiment includes automated specification and evaluation and/or testing of enterprise-related properties on AI models. In one or more embodiments, generated and/or recommended enterprise-related properties address at least one shortcoming of existing enterprise-related properties such as, for example, generalization, fairness, robustness, etc., and such an embodiment can include specifying an alternate distribution of test data (e.g., in some specific regions or otherwise) in given enterprise-related properties which is used for evaluation. Additionally, such an embodiment includes automatically generating realistic synthetic test data based at least in part on user-defined specification of a counterfactual world (i.e., the above-noted alternate distribution of test data), and identifying one or more inflection points and/or one or more regions as to where enterprise-related property value(s) change(s). Further, at least one embodiment includes executing test data against the given AI model and obtaining test results based on the generated properties, and automatically generating and/or recommending one or more new and/or modified enterprise-related properties based at least in part on the results.

As used herein, an enterprise-related property refers generally to one or more metrics defined for different enterprise goals for an AI model. An enterprise-related property is characterized by input data characteristics and an output property to be evaluated. Also, an enterprise-related property can be defined as a conditional probability on one or more predicted class labels, output property and input data constraints. For example, given a dataset with predicted classes C and C', an enterprise-related property can be defined as follows:

Pr(class=C|out_property=O AND input_constraints=I)>t, OR

Pr(out_property=O|class=C AND input_constraints=I)>t, OR

Pr(class=C|out_property=O AND input_constraints=I)/Pr(class=C'|out_property=O' AND input_constraints=I)>t, wherein O and O' represent output properties, I represents the input constraints, and t represents a threshold for the defined property.

By way merely of illustration, an example of an enterprise-related property can include the following. Consider an AI-based customer churn prediction model which processes customer information and predicts if a customer can churn. Examples of enterprise-related property related to such a model can include, for instance, if the model has to be deployed in a region where the payload data has a 2:3 ratio for high-income young population to low-income young population (i.e., the input characteristics), then the customer churn (i.e., the output property) should not be more than 5% (i.e., the threshold).

As also used herein, characteristics define constraints on input and output. Input constraints can include, for example, a change which alters the characteristics of data (such as a change in interpretable constraints for a particular class of samples). Also, output constraints can be defined based at least in part on the classification and/or regression of different expressions, wherein such an expression can be defined on the output of a single sample or multiple samples selected by an expression.

Enterprise-related properties can enable specification of alternate distributions in multiple regions under which one or more enterprise key performance indicators (KPIs) can and/or should be evaluated. Accordingly, one or more embodiments address challenges of automated testing of enterprise-related properties by specifying at least one language for defining properties, implementing an automated test case generation and evaluation mechanism for testing such properties, and implementing automated recommendation of one or more enterprise-related properties.

FIG. 1 is a diagram illustrating system architecture, according to an embodiment of the invention. By way of illustration, FIG. 1 depicts automated AI model enterprise-related property testing system 110, which includes test data generator 112, test data execution component 114, and automated property recommendation engine 116. As depicted in FIG. 1, automated AI model enterprise-related property testing system 110 processes inputs in the form of AI model 102 (e.g., a given black box AI model), one or more enterprise-related property specifications 104, and training data and/or data distribution information 106. For example, in one or more embodiments, if training data is limited and/or not available, then data distribution information (e.g., learned from various data) can be extracted remotely and used. In this context, data distribution refers to probability distribution of the data, which may include multivariate data distributions, continuous distribution for numeric features, and discrete distribution for categorical and/or numeric features. Additionally or alternatively, at least one embodiment can utilize a count of test cases to be generated as an input for automated AI model enterprise-related property testing system 110.

Based at least in part on processing such input data, automated AI model enterprise-related property testing system 110 generates, using test data generator 112, realistic test data corresponding to the one or more enterprise-related property specifications 104. Also, using test data execution component 114, the generated test data are executed against the AI model 102 and test results are obtained based on the one or more enterprise-related property specifications 104. At least one embodiment includes identifying one or more inflection points and/or corresponding regions by recognizing data changes affecting the property evaluation and identifying inflection points where the property evaluation changes. The inflection points are identified by locating changes in input constraints that lead to changes in the property evaluated value. For example, if a small change in an input constraint for a feature leads to a change or a flip of the evaluated value, this change is identified as an inflection point. Additionally, automated AI model enterprise-related property testing system 110 automatically generates, using the automated property recommendation engine 116, one or more recommendations of new and/or modified enterprise-related properties. In one or more embodiments, automatically recommending enterprise-related properties can be based on the given test data and the automatic forming of one or more input constraints and one or more input features relevant for enterprise-related properties.

Referring again to FIG. 1, automated AI model enterprise-related property testing system 110 outputs test results and/or one or more enterprise-related property recommendations 120 to at least one user device 130 (e.g., at least one user device associated with the given enterprise). Such user device(s) 130 may comprise, for example, mobile telephones, laptop computers, tablet computers, desktop computers or other types of computing devices, and in some embodiments can include respective computers associated with a particular company, organization or other enterprise. Also, it is to be appreciated that the term "user" in this context and elsewhere herein is intended to be broadly construed so as to encompass, for example, human, hardware, software or firmware entities, as well as various combinations of such entities.

At least one embodiment includes implementing a property interpreter to process existing enterprise-related properties. Such properties can be written in at least one specified language and can be parsed using at least one parser generator (e.g., ANTLR). Parsed grammar can then be read and loaded as one or more additional what-if constraints, and these additional what-if constraints in addition to constraints from training data are used to synthesize test cases.

Also, as noted and further described herein, one or more embodiments include automatically generating recommendations of enterprise-related properties. Such an embodiment can include recommending one or more enterprise-related properties to a user based at least in part on given data, the automatic forming of input constraints and input features relevant for enterprise-related properties, and past and/or existing enterprise-related properties provided by and/or ranked by the user. Accordingly, a goal of one or more embodiments includes generating input data characteristics and output properties, given input data distribution and a given AI model.

In at least one such embodiment, multiple methods can be used to achieve such a goal. For example, a first method includes using a user's logs and preferences to determine common attributes and distributions in the users' logs and preferences, and ultimately create one or more enterprise-related properties based on the common attribute values. A second method includes using one or more informative subsets of data (e.g., subsets of data derived from statistical analysis), and for attributes in an informative subset, determining common and uncommon values. For instance, one or more enterprise-related properties can be identified for different frequency distributions of common and uncommon values, if: Pr (class=C|out_property=uncommon_values AND input_constraints=I)>t*Pr (class=C|out_property=common_values AND input_constraints=I). In other words, a property can be generated by identifying different data distribution of classes for uncommon and common values (i.e., less frequent and more frequent feature values).

By of way further example, a third method can include using a global explainer (e.g., pertaining to permutation importance) to determine the relative importance of attributes for the given AI model. For important attributes, such a method includes identifying common and uncommon values, and one or more enterprise-related properties can be identified for different frequency distributions of common and uncommon values, if: Pr (class=C|out_property=uncommon_values AND input_constraints=I)>t*Pr (class=C|out_property=common_values AND input_constraints=I).

A fourth method can include using a data region model analysis technique (e.g., slicing, clustering, decision tree training, lattice searching) to identify common attributes in one or more weak regions, and identifying common and uncommon values and distribution in data on these attributes. In this context, weak regions refer to data regions which are weak with respect to the given model. These are data regions wherein the model is confused or less certain about the model output. Additionally, such a method also includes identifying one or more enterprise-related properties for different frequency distributions of common and uncommon values, if: Pr (class=C|out_property= weak_region AND input_constraints=I)>t*Pr (class=C|out_ property=strong_region AND input_constraints=I).

As also detailed herein, one or more embodiments include implementing a data synthesis algorithm that can include, for example, what-if test cases. A goal of such an algorithm includes matching input data constraints based on given enterprise-related property input characteristics (e.g., conditional realistic). For example, if one or more enterprise-related property input characteristics state that the ratio of group1 to group2 should be 1:2, then the synthetic data should have the same distribution for all attributes and joint distribution as the data conditioned on the attributes corresponding to the two groups. As used herein, an attribute refers to a feature and/or column in tabular data.

In at least one embodiment, data synthesis algorithm characteristics can include preserving continuous and discrete marginal distributions (e.g., less divergence), preserving conditional distribution of numerical and categorical attributes, overriding data constraints by enterprise-related property input data characteristics, and scaling generated data to retain original distribution(s).

Additionally, one or more embodiments includes implementing an algorithm that includes fetching data constraints that can include, for example, feature constraints (e.g., distributions, frequency, statistical properties, etc.) and associations for pairs of attributes (e.g., correlations, frequency distributions, etc.). The algorithm also includes creating a constraints dependency graph (CDG) based at least in part on the data constraints, wherein the CDG represents a weighted directed graph with attributes as nodes and associations as edges, with confidence of associations as respective edge weights. Also, in one or more embodiments, each node of the CDG contains the constraints of the corresponding attribute.

The above-noted algorithm additionally includes updating the CDG using input data characteristics, if given. For example, such input data characteristics can include updating and/or overriding node constraints from attribute enterprise-related properties, and removing all incoming edges to an enterprise-related property node. The algorithm can also include creating a directed acyclic graph (DAG) (e.g., by breaking cycles in the CDG using confidence of dependencies), sorting the DAG topologically to determine an attribute generation order, and generating test data in the attribute order using constraints for each node. For example, at least one embodiment includes using node constraints and incoming association edges in the DAG to generate realistic test cases.

Figure 2:
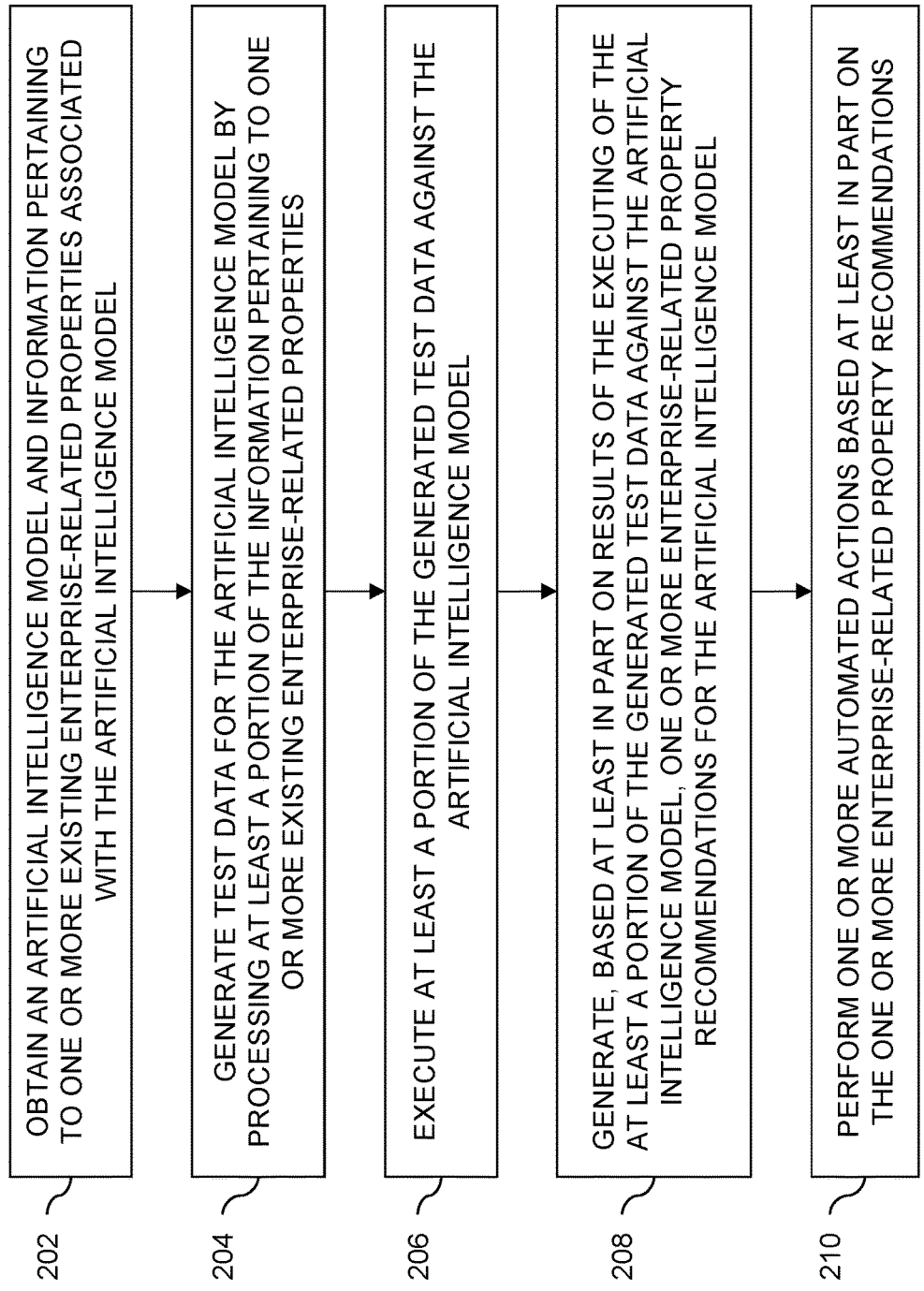
FIG. 2 is a flow diagram illustrating techniques according to an example embodiment of the invention.

FIG. 2 is a flow diagram illustrating techniques according to an embodiment of the present invention. Step 202 includes obtaining an artificial intelligence model and information pertaining to one or more existing enterprise-related properties associated with the artificial intelligence model.

Step 204 includes generating test data for the artificial intelligence model by processing at least a portion of the information pertaining to one or more existing enterprise-related properties. In at least one embodiment, generating test data includes obtaining data constraints associated with at least one of the enterprise and the artificial intelligence model and creating a constraints dependency graph using at least a portion of the obtained data constraints, wherein the constraints dependency graph includes a weighted directed graph with attributes as nodes, associations as edges, and confidence of associations as respective edge weights, and wherein each node contains one or more constraints of the corresponding attribute. In such an embodiment, obtaining data constraints can include obtaining one or more feature constraints pertaining to at least one of distributions, correlations, frequency, and statistical properties. Additionally, in such an embodiment, generating test data can also include creating a directed acyclic graph based at least in part on confidence of one or more dependencies in the constraints dependency graph, generating an attribute generating order by sorting the directed acyclic graph topologically, and generating test data in accordance with the attribute generating order using one or more constraints for each node in the directed acyclic graph. Further, one or more embodiments can include updating the constraints dependency graph using one or more input data characteristics.

Step 206 includes executing at least a portion of the generated test data against the artificial intelligence model. Step 208 includes generating, based at least in part on results of the executing of the at least a portion of the generated test data against the artificial intelligence model, one or more enterprise-related property recommendations for the artificial intelligence model. In at least one embodiment, generating one or more enterprise-related property recommendations includes generating one or more recommendations pertaining to creating one or more new enterprise-related properties and/or generating one or more recommendations pertaining to modifying at least a portion of the one or more existing enterprise-related properties. Additionally or alternatively, generating one or more enterprise-related property recommendations can include identifying, based at least in part on the results, one or more inflection points in connection with the generated test data.

Step 210 includes performing one or more automated actions based at least in part on the one or more enterprise-related property recommendations. In one or more embodiments, performing one or more automated actions includes automatically implementing at least a portion of the one or more enterprise-related property recommendations in connection with the artificial intelligence model and/or outputting at least a portion of the one or more enterprise-related property recommendations to one or more users associated with the enterprise. Additionally or alternatively, performing one or more automated actions can include automatically training the artificial intelligence model using at least one of results of the executing of the at least a portion of the generated test data against the artificial intelligence model and the one or more enterprise-related property recommendations.

Also, in at least one embodiment, software implementing the techniques depicted in FIG. 2 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
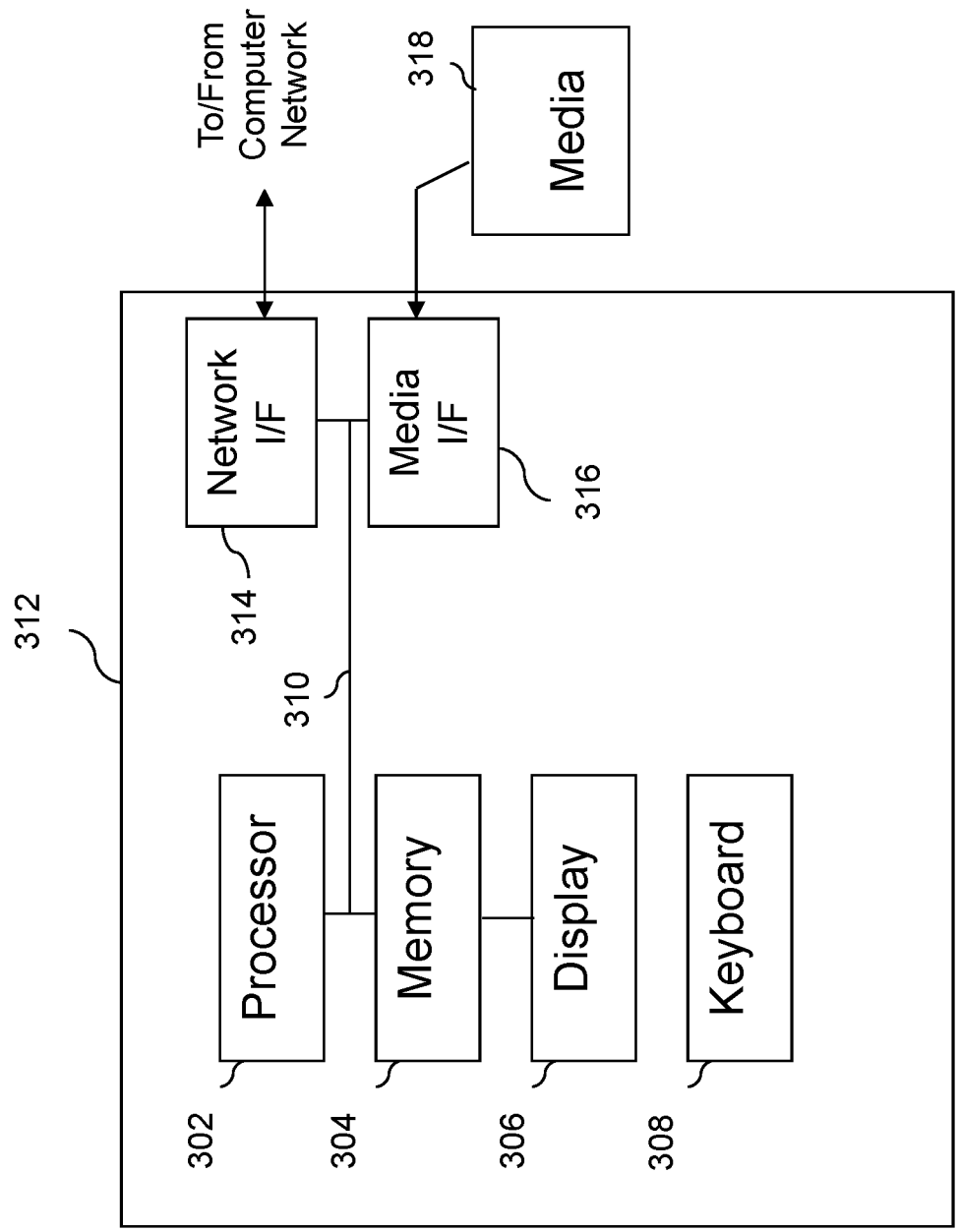
FIG. 3 is a system diagram of an example computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
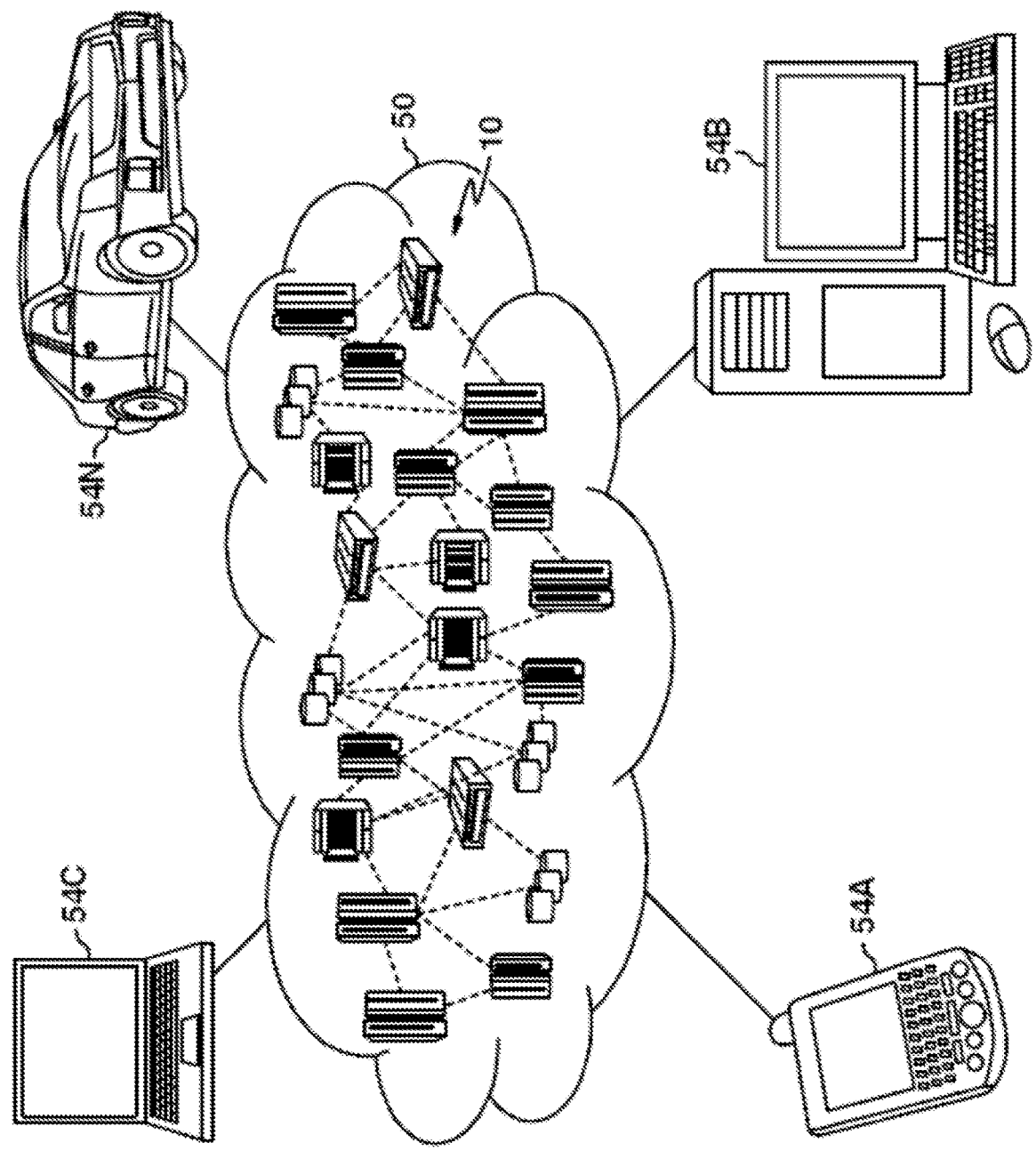
FIG. 4 depicts a cloud computing environment according to an example embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
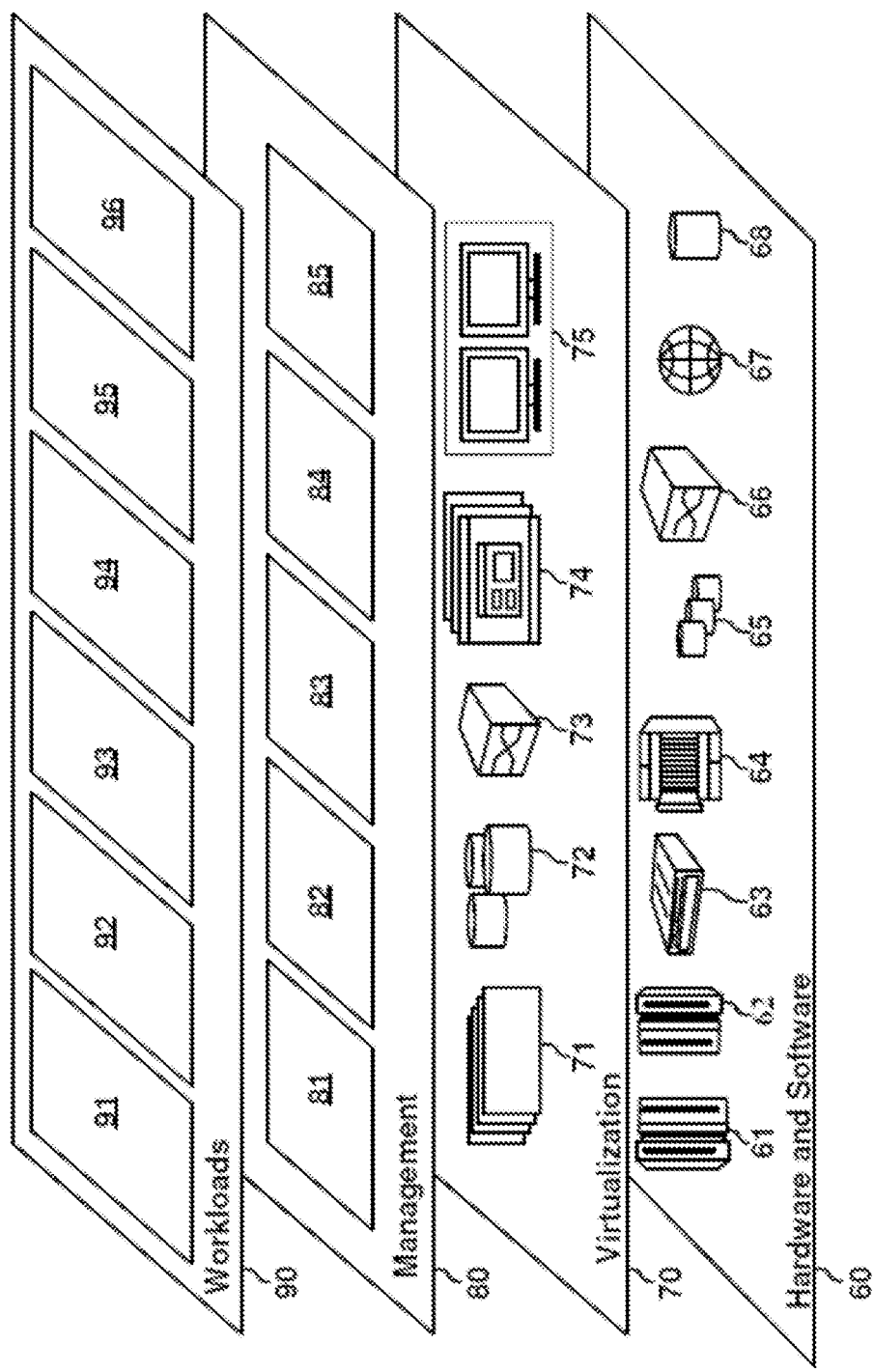
FIG. 5 depicts abstraction model layers according to an example embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AI model testing 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically testing AI models in connection with enterprise-related properties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining an artificial intelligence model and information pertaining to one or more existing properties associated with the artificial intelligence model;
    generating test data for the artificial intelligence model by processing at least a portion of the information pertaining to one or more existing properties;
    executing at least a portion of the generated test data against the artificial intelligence model;
    generating, based at least in part on results of the executing of the at least a portion of the generated test data against the artificial intelligence model, one or more property recommendations for the artificial intelligence model comprising one or more conditional probabilities defined on at least one of one or more predicted class labels, at least one output property, and one or more input constraints, wherein generating one or more property recommendations comprises determining, based at least in part on the results, one or more inflection points by identifying one or more property evaluation changes resulting from one or more input constraint changes associated with the artificial intelligence model; and
    performing one or more automated actions based at least in part on the one or more property recommendations;
    wherein the method is carried out by at least one computing device.

2. The computer-implemented method of claim 1, wherein generating test data comprises:
    obtaining data constraints associated with the artificial intelligence model; and
    creating a constraints dependency graph using at least a portion of the obtained data constraints, wherein the constraints dependency graph comprises a weighted directed graph with attributes as nodes, associations as edges, and confidence of associations as respective edge weights, and wherein each node contains one or more constraints of the corresponding attribute.

3. The computer-implemented method of claim 2, wherein obtaining data constraints comprises obtaining one or more feature constraints pertaining to at least one of distributions, correlations, frequency, and statistical properties.

4. The computer-implemented method of claim 2, wherein generating test data comprises:
    creating a directed acyclic graph based at least in part on confidence of one or more dependencies in the constraints dependency graph;
    generating an attribute generating order by sorting the directed acyclic graph topologically; and
    generating test data in accordance with the attribute generating order using one or more constraints for each node in the directed acyclic graph.

5. The computer-implemented method of claim 2, further comprising:
    updating the constraints dependency graph using one or more input data characteristics.

6. The computer-implemented method of claim 1, wherein generating one or more property recommendations comprises generating one or more recommendations pertaining to creating one or more new properties.

7. The computer-implemented method of claim 1, wherein generating one or more property recommendations comprises generating one or more recommendations pertaining to modifying at least a portion of the one or more existing properties.

8. The computer-implemented method of claim 1, wherein performing one or more automated actions comprises automatically implementing at least a portion of the one or more property recommendations in connection with the artificial intelligence model.

9. The computer-implemented method of claim 1, wherein performing one or more automated actions comprises outputting at least a portion of the one or more property recommendations to one or more users.

10. The computer-implemented method of claim 1, wherein performing one or more automated actions comprises automatically training the artificial intelligence model using at least one of results of the executing of the at least a portion of the generated test data against the artificial intelligence model and the one or more property recommendations.

11. The computer-implemented method of claim 1, wherein software implementing the method is provided as a service in a cloud environment.

12. A computer program product comprising a computer readable storage medium having program instructions embodied therewith, the program instructions executable by a computing device to cause the computing device to:
   obtain an artificial intelligence model and information pertaining to one or more existing properties associated with the artificial intelligence model;
   generate test data for the artificial intelligence model by processing at least a portion of the information pertaining to one or more existing properties;
   execute at least a portion of the generated test data against the artificial intelligence model;
   generate, based at least in part on results of the executing of the at least a portion of the generated test data against the artificial intelligence model, one or more property recommendations for the artificial intelligence model comprising one or more conditional probabilities defined on at least one of one or more predicted class labels, at least one output property, and one or more input constraints, wherein generating one or more property recommendations comprises determining, based at least in part on the results, one or more inflection points by identifying one or more property evaluation changes resulting from one or more input constraint changes associated with the artificial intelligence model; and
   perform one or more automated actions based at least in part on the one or more property recommendations.

13. The computer program product of claim 12, wherein generating test data comprises:
   obtaining data constraints associated with the artificial intelligence model; and
   creating a constraints dependency graph using at least a portion of the obtained data constraints, wherein the constraints dependency graph comprises a weighted directed graph with attributes as nodes, associations as edges, and confidence of associations as respective edge weights, and wherein each node contains one or more constraints of the corresponding attribute.

14. The computer program product of claim 13, wherein generating test data comprises:
   creating a directed acyclic graph based at least in part on confidence of one or more dependencies in the constraints dependency graph;
   generating an attribute generating order by sorting the directed acyclic graph topologically; and
   generating test data in accordance with the attribute generating order using one or more constraints for each node in the directed acyclic graph.

15. The computer program product of claim 12, wherein generating one or more property recommendations comprises generating one or more recommendations pertaining to creating one or more new properties.

16. The computer program product of claim 12, wherein generating one or more property recommendations comprises generating one or more recommendations pertaining to modifying at least a portion of the one or more existing properties.

17. The computer program product of claim 12, wherein performing one or more automated actions comprises automatically implementing at least a portion of the one or more property recommendations in connection with the artificial intelligence model.

18. The computer program product of claim 12, wherein performing one or more automated actions comprises outputting at least a portion of the one or more property recommendations to one or more users.

19. A system comprising:
   a memory configured to store program instructions; and
   a processor operatively coupled to the memory to execute the program instructions to:
      obtain an artificial intelligence model and information pertaining to one or more existing properties associated with the artificial intelligence model;
      generate test data for the artificial intelligence model by processing at least a portion of the information pertaining to one or more existing properties;
      execute at least a portion of the generated test data against the artificial intelligence model;
      generate, based at least in part on results of the executing of the at least a portion of the generated test data against the artificial intelligence model, one or more property recommendations for the artificial intelligence model comprising one or more conditional probabilities defined on at least one of one or more predicted class labels, at least one output property, and one or more input constraints, wherein generating one or more property recommendations comprises determining, based at least in part on the results, one or more inflection points by identifying one or more property evaluation changes resulting from one or more input constraint changes associated with the artificial intelligence model; and
      perform one or more automated actions based at least in part on the one or more property recommendations.

20. The system of claim 19, wherein generating test data comprises:
   obtaining data constraints associated with the artificial intelligence model; and
   creating a constraints dependency graph using at least a portion of the obtained data constraints, wherein the constraints dependency graph comprises a weighted directed graph with attributes as nodes, associations as edges, and confidence of associations as respective edge weights, and wherein each node contains one or more constraints of the corresponding attribute.

* * * * *